US006435170B1

(12) United States Patent
Hamelink et al.

(10) Patent No.: US 6,435,170 B1
(45) Date of Patent: Aug. 20, 2002

(54) CRANKCASE BYPASS SYSTEM WITH OIL SCAVENGING DEVICE

(75) Inventors: Joseph C. Hamelink, N. Muskegon; Stephen H. Hill, Muskegon, both of MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/920,224

(22) Filed: Aug. 1, 2001

(51) Int. Cl.[7] ................................................ F02B 25/06
(52) U.S. Cl. ...................................................... 123/572
(58) Field of Search ................................ 123/572, 573, 123/574, 41.86

(56) References Cited

U.S. PATENT DOCUMENTS

| | | | |
|---|---|---|---|
| 3,088,447 A | 5/1963 | Henderson | |
| 3,946,710 A | * 3/1976 | Albano et al. | 123/572 |
| 4,291,382 A | 9/1981 | Full et al. | |
| 4,443,334 A | 4/1984 | Shugarman et al. | |
| 4,453,525 A | * 6/1984 | Debruler | 123/573 |
| 4,627,406 A | 12/1986 | Namiki et al. | |
| 4,667,647 A | * 5/1987 | Ohtaka et al. | 123/573 |
| 4,686,952 A | * 8/1987 | Zeigler, Jr. et al. | 123/572 |
| 4,721,090 A | * 1/1988 | Kato | 123/572 |
| 4,856,487 A | 8/1989 | Furuya | |
| 4,873,961 A | 10/1989 | Tanaka | |
| 4,901,703 A | * 2/1990 | Humphries | 123/572 |
| 5,186,278 A | 2/1993 | Ives et al. | |
| 5,329,913 A | 7/1994 | Suzuki et al. | |
| 5,507,268 A | 4/1996 | Schlattl | |
| 5,585,552 A | 12/1996 | Heuston et al. | |
| 5,722,376 A | 3/1998 | Sweeten | |
| 5,753,805 A | 5/1998 | Maloney | |
| 5,792,949 A | * 8/1998 | Hewelt et al. | 123/41.86 |
| 5,897,597 A | 4/1999 | O'Daniel | |
| 5,937,798 A | 8/1999 | Cheng et al. | |
| 6,016,460 A | 1/2000 | Olin et al. | |
| 6,098,603 A | 8/2000 | Maegawa et al. | |
| 6,123,061 A | * 9/2000 | Baker et al. | 123/573 |
| 6,129,058 A | 10/2000 | Muth | |

* cited by examiner

Primary Examiner—Marguerite McMahon
(74) Attorney, Agent, or Firm—Rader, Fishman & Grauer PLLC

(57) ABSTRACT

An engine crankcase bypass system includes a scavenging mechanism for the collection and removal of oil entrained in engine bypass gases that include unburned gasoline fuel and water vapors. The improved bypass system, designed to replace a standard PCV (positive crankcase ventilation) system, senses manifold and crankcase vacuum pressures, and via utilization of either an electronic or mechanical valve provides continuous adjustments of bypass gas flows for the maintenance of a constant gas flow sufficient to exceed normal engine bypass flow rates. A deflector system positioned in a flow stream is designed to extract and separate oil vapor from unburned gasoline fuel and water vapors entrained in the bypass gases. The oil is collected and drained to a temporary reservoir for subsequent re-entry into the oil sump of the engine. The fuel and water vapors are immediately returned to the intake manifold of the engine for reburning of the fuel.

10 Claims, 3 Drawing Sheets

CRANKCASE BYPASS SYSTEM WITH OIL SCAVENGING DEVICE

BACKGROUND OF THE INVENTION

1. Field of Invention

The present invention relates to engine crankcase ventilation systems adapted to control by-pass gases composed of blow-by gas and fresh air. More particularly, the invention relates to an improved scavenging mechanism for separation of oil from a flow stream of by-pass gases entrained with oil and unburned fuel and water vapors, and to result in improved ventilation flow control.

2. Description of the Prior Art

Those skilled in the art will appreciate, contrary to ideal expectations, that combustion gases are not normally confined to the combustion chamber and exhaust manifold areas of an engine. A phenomenon called "engine blow-by" unfortunately assures that some of the combustion gases will escape the combustion chamber and flow into the engine crankcase, irrespective of the quality of the engine and/or the piston rings employed. Engine blow-by occurs on the power stroke of an internal combustion engine; i.e., the normally downward stroke of the piston caused by ignition of the fuel air mixture during the combustion cycle.

The typical mechanism for relieving an otherwise substantial crankcase pressure buildup has been the so-called PCV (positive crankcase ventilation) valve. The standard PCV valve, however, has been deficient in several respects. For example, the valve has not consistently provided satisfactory by-pass gas flows under the full range of engine performance, i.e., from idle through full wide-open throttle conditions, and particularly as impacted by wear due to operation. For example, under very high rpm conditions, the valve has often been ineffective to fully relieve crankcase pressure, particularly under high engine loads or low vacuum conditions. In addition, the typical PCV valve system has been ineffective to separate entrained oil from the flow stream of unburned gasoline and water vapors, even where orifices and deflectors have been employed.

Although several efforts have been made to improve overall performances of scavenging mechanisms designed to remove entrained oil from flow streams of blow-by gases, including unburned gasoline fuel and water vapors, such efforts have been met with only limited success, and been relatively expensive. In some cases, complex apparatus installed on the engine for such purposes has contributed only a small benefit for a significant inconvenience.

Finally, such apparatus has not only been relatively complex, but also difficult to maintain. Indeed, in some cases the complexity has outweighed any advantages because of extensive maintenance required for proper continuous system operation.

SUMMARY OF THE INVENTION

The present invention provides an improved engine crankcase bypass system that incorporates a scavenging mechanism adapted for collection and removal of oil entrained in engine bypass gases. Such gases normally include unburned gasoline fuel and water vapors. The improved ventilation system, designed to replace a standard PCV (positive crankcase ventilation) system, senses manifold and crankcase vacuum pressure, and via either an electronic or mechanical valve makes continuous adjustments of bypass gas flows to maintain a constant gas flow in excess of normal engine bypass gas flow rates. A deflector system installed conveniently within, an engine rocker cover is positioned in the bypass flow stream, and is designed to extract and separate oil vapor from the unburned gasoline fuel and water vapors entrained in the bypass gases. The oil is collected and returned to a reservoir for subsequent re-entry into the oil sump of the engine. The fuel and water vapors are allowed to continue to the intake manifold of the engine for reburning of the fuel.

In the described embodiment, the scavenging mechanism is effective to remove a high percentage of oil otherwise lost through the exhaust system per approximately 400 miles of driving. A transient oil reservoir is designed to have sufficient capacity to accommodate the oil extracted from the bypass gases. Upon shutting off the engine, vacuum produced by the engine is terminated, and oil collected in a transient reservoir is drained into an engine oil sump. The later action is facilitated by the release of a normally closed drain valve.

DETAILED DESCRIPTION OF THE EMBODIMENTS

Figure 1:
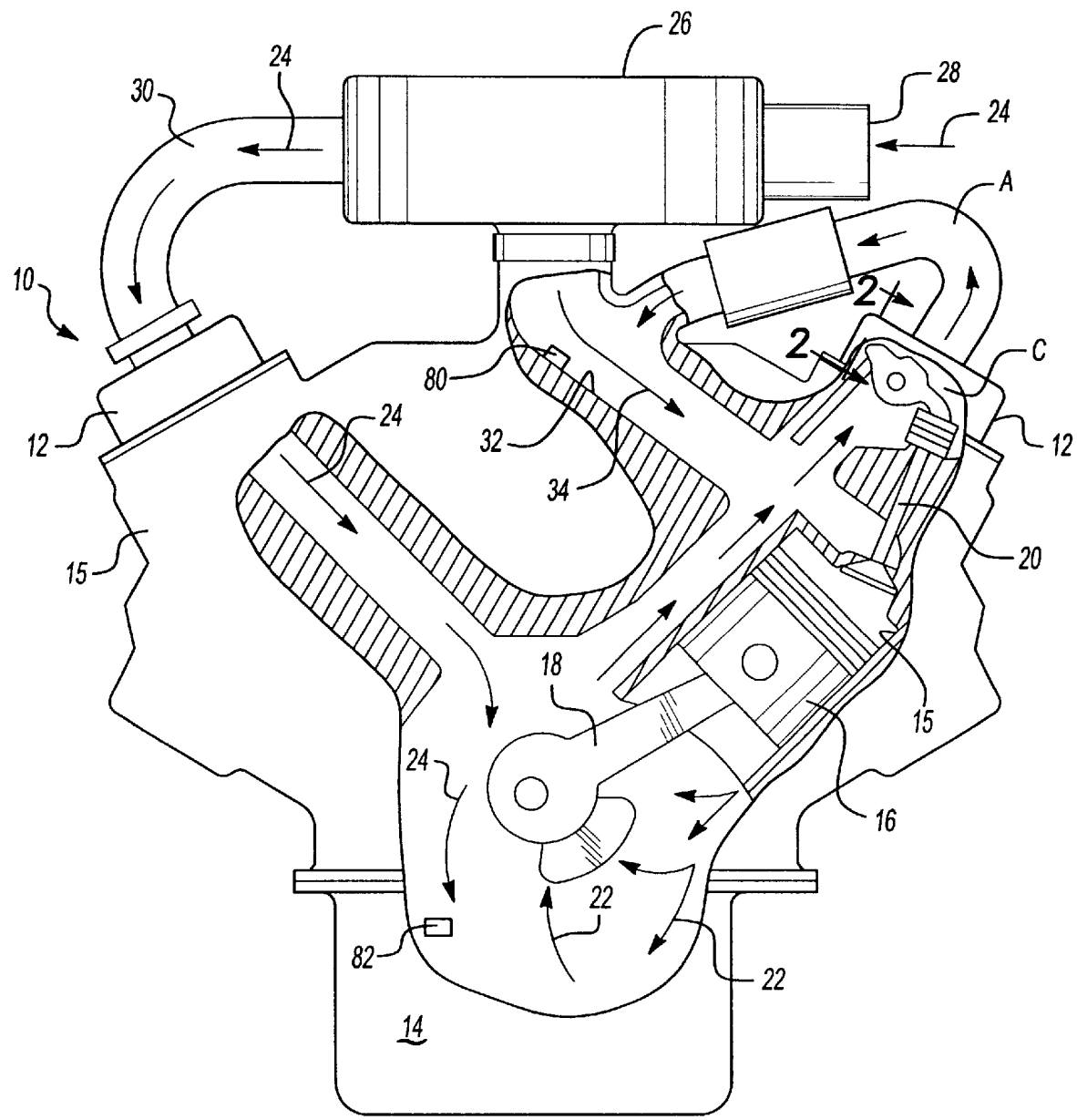
FIG. 1 is a schematic view of a prior art internal combustion engine with portions partially cut away to reveal various components pertinent to a discussion of the operation of the improved crankcase evacuation and scavenging system of the present invention.

Referring initially to FIG. 1, a schematic view of an internal combustion engine 10 is presented. Portions of the engine 10 are cut away to reveal one bank of cylinders 15 positioned under a rocker cover 12 to reveal the paths or movements of fresh air (arrows 24) and bypass gas flow stream (arrows 22) through various parts of the engine. An oil sump 14 is provided at the base of the engine 10, and a representative piston 16 reciprocates within the cylinder 15, the piston 16 being connected to a crankshaft connecting rod 18, as will be appreciated by those skilled in the art. Sets of intake and exhaust valves 20 admit air and release exhaust gases, respectively, into and out of the engine 10.

At the upper portion of the engine 10 is an air filter canister 26 adapted to admit fresh air 24 into an air intake nozzle 28. The fresh air 24 is filtered in the canister 26, and then travels through a hose or conduit 30 into one of the banks of cylinders 15. Although shown only schematically, it will be appreciated that the greatest amount of the fresh air (arrow 34) received through the air intake nozzle 28 provides the air necessary for engine combustion. The air 34 travels into an intake manifold 32 and into an intake area (not specifically shown in the schematic) for mixing with fuel to support internal combustion, as will be appreciated by those skilled in this art.

Figure 2:
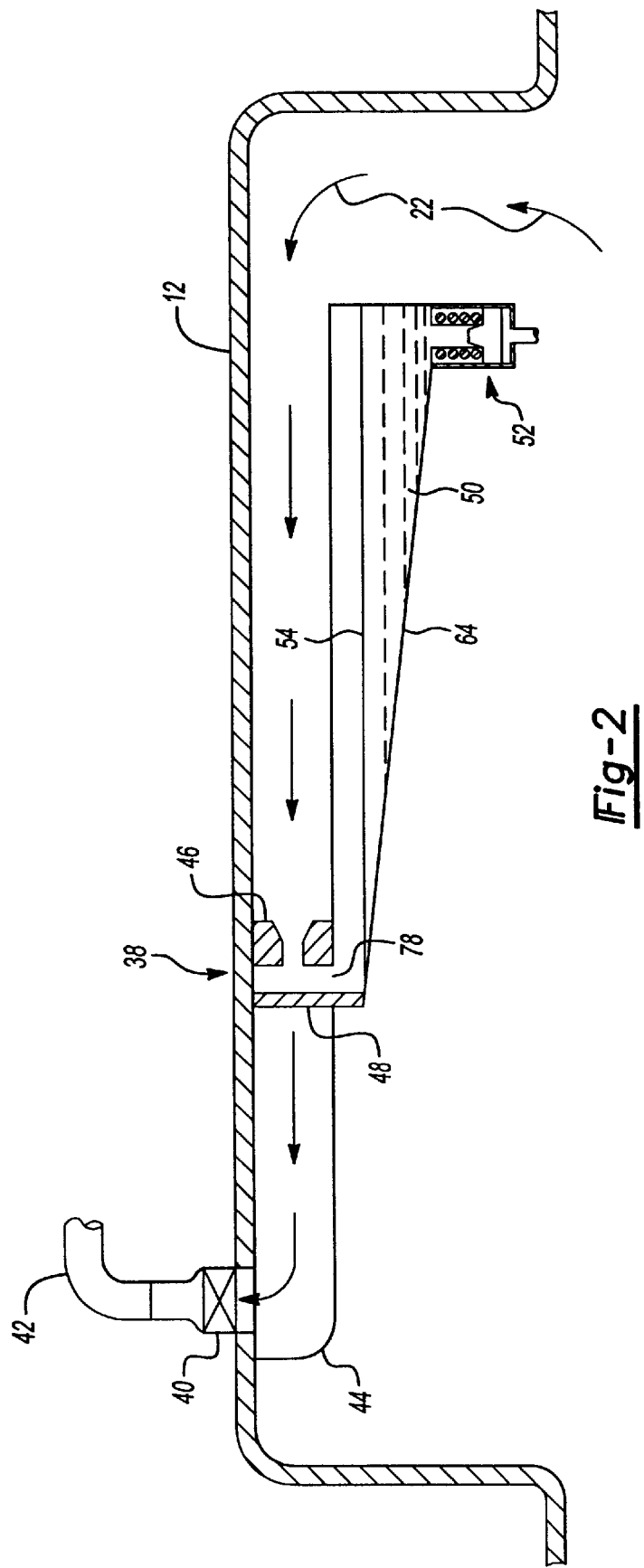
FIG. 2 is a cross-section taken along lines 2—2 of FIG. 1, showing components of one described embodiment of the crankcase bypass and oil scavenging system of the present invention.

FIG. 2 is a cross-sectional view of the rocker cover 12, taken along lines 2—2 of FIG. 1. A so-called smart PCV valve 40 of the present invention is adapted to sense manifold vacuum and sump pressure differentials, and to thereby adjust or modulate the openings of the valve 40 to assure a relatively constant flow rate of bypass gases 22 throughout the engine paths adapted to accommodate such gases, as depicted in FIG. 1. The engine 10 thus includes pressure sensors 80, 82, which are located in the intake manifold 32 and oil sump 14 regions of the engine 10, respectively.

Immediately attached to the underside of the upper body of the rocker cover 12 is a built-in closed duct passageway 44. Blow-by gases are drawn from the sump 14 (FIG. 1) and pass through the passageway 44 moving generally in the direction of the arrows 22. The blow-by gases pass through the valve 40, being drawn into a tube 42 under vacuum produced at the intake manifold. In the described embodiment, the valve 40 is adapted to adjust the bypass gas flow to maintain a constant flow rate that exceeds maximum engine blow-by gas flow, typically at least 5 to 7 cubic feet per minute.

An oil deflector system 38 is adapted to remove oil entrained in the bypass gas flow stream 22 from the bypass gases. The bypass gases include not only the oil, but also unburned fuel and water vapors. The system 38 includes a slotted orifice 46 through which the flow stream passes, and an impactor plate 48 downstream of the orifice 46. The impactor plate 48 is positioned immediately behind the slotted orifice 46, and thus only partially blocks the passageway 44. The droplets of oil entrained within the bypass flow stream speed up through the slotted orifice and impact the impactor plate 48. The unburned fuel and the water vapor, having higher volatilities and formed of generally smaller droplets, are enabled to continue past the impactor plate 48 and to travel through the valve 40 into the tube 42 to the manifold, and to directly re-enter the combustion chamber of the engine, thus permitting immediate reuse of the unburned fuel.

Figure 3:
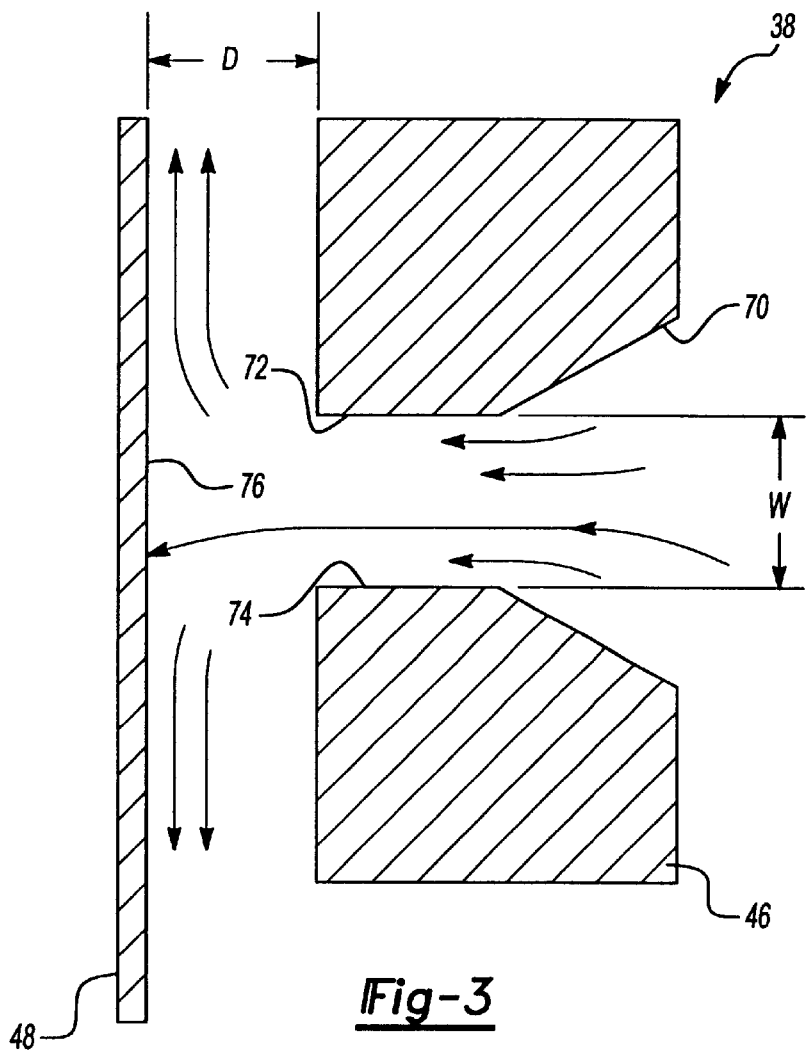
FIG. 3 is an enlarged view of the deflector system employed, including an impactor plate and a slotted orifice of the embodiment of FIG. 2.

Referring now to FIG. 3, the orifice 46 is adapted to fully block the passageway 44 (FIG. 2) except for a slotted flow path defined by a pair of spaced orifice walls 72 and 74 that define the width W of the orifice 46. Leading into the slotted flow path is a converging nozzle throat 70 through which acceleration of the bypass gas is facilitated via Bernoulli's Principle for impact of the oil droplets against an impact surface 76 of the plate 48. In the described embodiment, the distance D between the slotted orifice 46 and the impactor surface 76 will be such that the ratio D/W falls within a range of 1.5 to 10.

The oil drains by gravity from the surface 76, down through a drain aperture 78 (FIG. 2), and into a temporary oil reservoir 50, having an angled floor 64 to facilitate gravity flow and collection of the oil retrieved by the deflector system 38. In the embodiment disclosed, the reservoir 50 is sized to accommodate an amount of oil from the bypass gas flow stream 22 as would be expected to accumulate from normal engine operation over a 400 miles range. As such, the temporary oil reservoir 50 is to be sized for any given engine so that the level 54 of oil collected in the reservoir will not rise to a height sufficient to reach the drain aperture 78 in at least 400 miles of driving. A twelve-ounce reservoir is contemplated for meeting this requirement for the average passenger vehicle. Upon engine shut down, the oil will drain from the reservoir 50 and into the oil sump 14, as now described.

In FIG. 2, a vacuum controlled reservoir drain valve 52 is shown positioned at the bottom of the temporary oil reservoir 50. The drain valve 52 remains fully closed during operation of the engine under which time a vacuum is successfully maintained in the manifold of the engine. Upon engine shut down, however, the valve 52 is designed to open due to cessation of vacuum.

Figure 4:
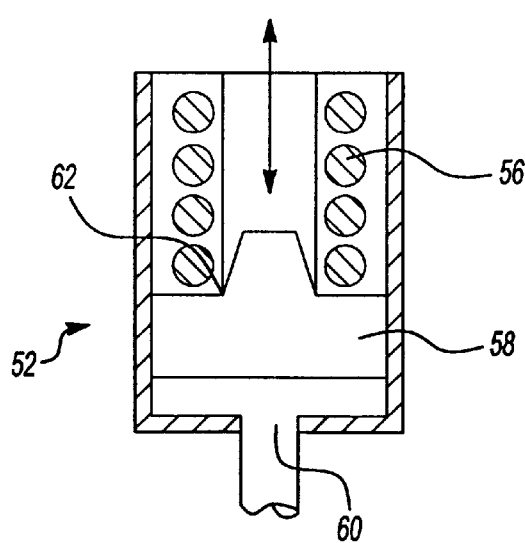
FIG. 4 is an enlarged view of a drain value situated at the bottom of an oil reservoir that forms a described portion of the same embodiment.

Referring more particularly to FIG. 4, the drain valve 52 is depicted in greater detail. The valve includes a spring 56 adapted to force a plunger 58 down toward a drain hole 60. During engine operation, however, the vacuum produced is sufficient to overcome the spring force and to hold the plunger up against the bottom of a drain cylinder 62. This keeps the oil from draining out of the temporary oil reservoir 50 until the engine 10 is actually shut down. Upon shut down, the vacuum is broken, and the spring 56 is then free to urge the plunger downwardly away from the bottom of the drain cylinder 62, permitting oil to pass through the drain hole 60, and into the oil sump 14.

It is to be understood that the above description is intended to be illustrative and not limiting. Many embodiments will be apparent to those skilled in the art upon reading the above description. The scope of the invention should be determined, however, not with reference to the above description, but with reference to the appended claims with full scope of equivalents to which such claims are entitled.

What is claimed is:

1. An engine crankcase bypass system comprising:
   a) a scavenging mechanism adapted for collection and removal of oil from an engine bypass gas flow stream, said mechanism adapted to effectively remove said oil from entrained unburned fuel and water vapors in said flow stream during entire operating performance range of said engine;
   b) sensors for measuring at least engine intake manifold and crankcase vacuum pressures;
   c) a modulating gas flow valve responsive to said sensor measurements of pressures to control flow stream volume of said bypass gases, said valve being adapted to provide continuous adjustments of bypass gas flows through said crankcase to provide a constant bypass gas flow rate; and
   d) a deflector system disposed directly within said flow stream and adapted to extract and separate oil vapor from said entrained unburned fuel and water vapors in said constant rate flow stream.

2. The engine crankcase bypass system of claim 1 wherein said scavenging mechanism collects said oil for conveyance thereof to a temporary oil reservoir for subsequent transfer to an engine oil sump, and wherein said entrained unburned fuel and water vapors in said flow stream are immediately returned to said intake manifold of the engine for reuse of said unburned fuel.

3. The engine crankcase bypass system of claim 2 wherein said constant rate flow stream of bypass gases that exceeds maximum engine blow-by gas flow within a range of 5 to 7 cubic feet per minute.

4. The engine crankcase bypass system of claim 3 further comprising a temporary oil reservoir adapted to collect oil extracted and separated from said bypass gases that include said entrained unburned fuel and water vapors.

5. The engine crankcase bypass system of claim 4 further comprising a closed duct passageway integrally fixed to a rocker cover of any engine, wherein bypass gases flow through said duct, and wherein said oil deflector system is fixed within said duct.

6. The engine crankcase bypass system of claim of claim 5 wherein said modulating gas flow valve is a constant flow PCV valve subject to modulation based upon differentials between the engine manifold and engine sump pressures.

7. The engine crankcase bypass system of claim 6 wherein said deflector system comprises an impactor plate and an orifice plate spaced therefrom, and wherein the distance between said plates and the size of an orifice in said orifice plate comprises a controlled ratio.

8. The engine crankcase bypass system of claim 7 wherein said controlled ratio has a value ranging between 1.5 and 10.

9. The engine crankcase bypass system of claim 8 wherein the orifice plate of said oil deflector system includes a nozzle throat adjacent the orifice, wherein said throat is adapted to accelerate said bypass gas flow stream movement, and whereby said entrained oil vapor impacts said impactor plate and becomes separated from said bypass gas.

10. The engine crankcase bypass system of claim 9 wherein said reservoir comprises a drain valve situated at the bottom of said reservoir, and wherein said valve is responsive to vacuum pressure to retain said valve in a closed position.

\* \* \* \* \*

UNITED STATES PATENT AND TRADEMARK OFFICE
CERTIFICATE OF CORRECTION

PATENT NO.    : 6,435,170 B1
DATED         : August 20, 2002
INVENTOR(S)   : Joseph C. Hamelink et al.

It is certified that error appears in the above-identified patent and that said Letters Patent is hereby corrected as shown below:

Column 4,
Line 64, replace "bypass system of claim of claim" with -- bypass system of claim --.

Signed and Sealed this

Twenty-fifth Day of February, 2003

JAMES E. ROGAN
*Director of the United States Patent and Trademark Office*